(12) United States Patent
Nuhn (10) Patent No.: US 10,066,629 B2
(45) Date of Patent: Sep. 4, 2018

(54) PUMP FOR IMMERSION WITHIN A FLUID RESERVOIR

(71) Applicant: Nuhn Industries Limited, Sebringville (CA)

(72) Inventor: Ian Nuhn, Sebringville (CA)

(*) Notice: Subject to any disclaimer, the term of this patent is extended or adjusted under 35 U.S.C. 154(b) by 242 days.

(21) Appl. No.: 15/063,566

(22) Filed: Mar. 8, 2016

(65) Prior Publication Data

US 2016/0186776 A1 Jun. 30, 2016

Related U.S. Application Data

(63) Continuation of application No. 14/570,504, filed on Dec. 15, 2014, now Pat. No. 9,488,190, which is a
(Continued)

(51) Int. Cl.
*F04D 7/04* (2006.01)
*F04D 25/06* (2006.01)
(Continued)

(52) U.S. Cl.
CPC .......... *F04D 25/0686* (2013.01); *A01C 3/026* (2013.01); *A01C 3/06* (2013.01);
(Continued)

(58) Field of Classification Search
CPC .. F04D 29/628; F04D 29/466; F04D 25/0686; F04D 13/08; F04D 7/04;
(Continued)

(56) References Cited

U.S. PATENT DOCUMENTS 2,890,659 A 6/1959 Haentjens et al.
3,417,929 A * 12/1968 Secrest ............... B02C 18/0092
241/246
(Continued)

FOREIGN PATENT DOCUMENTS

EP 1782882 A1 5/2007

OTHER PUBLICATIONS

Office Action dated Aug. 30, 2016 on Canadian Application CA 2,733,049.
(Continued)

*Primary Examiner* — Ninh H Nguyen
(74) *Attorney, Agent, or Firm* — Brunet & Co. Ltd.; Robert Brunet; Hans Koenig (57) ABSTRACT

A pump is provided for immersion in a fluid reservoir, such as a pit or lagoon containing liquid manure, from a position at an edge of the reservoir. The pump may be adapted for connection to a farm vehicle, such as a tractor, positioned at the edge of the reservoir. The pump comprises an extensible body, fluid conduit and drive means in order that a length of the pump may be varied in order to accommodate a variety of reservoir fluid heights. In addition, the pump may be pivotable relative to at least a portion of a frame in order that the entrance angle may be adjusted. The pump may comprise a housing with an inlet and an outlet, the outlet in fluid communication with the fluid conduit. An impeller within the housing may direct fluid from the inlet to the outlet in the housing.

39 Claims, 12 Drawing Sheets

Related U.S. Application Data continuation of application No. 13/038,189, filed on Mar. 1, 2011, now Pat. No. 8,944,758.

(51) Int. Cl.

| | |
|---|---|
| *A01C 23/00* | (2006.01) |
| *F04D 29/62* | (2006.01) |
| *F04D 13/08* | (2006.01) |
| *F04D 29/60* | (2006.01) |
| *F04D 3/00* | (2006.01) |
| *F04D 13/02* | (2006.01) |
| *A01C 3/02* | (2006.01) |
| *A01C 23/04* | (2006.01) |
| *A01C 3/06* | (2006.01) |
| *F04D 7/02* | (2006.01) |
| *F04D 29/24* | (2006.01) |
| *F04D 29/42* | (2006.01) |
| *F04D 29/46* | (2006.01) |

(52) U.S. Cl.
CPC .......... *A01C 23/002* (2013.01); *A01C 23/005* (2013.01); *A01C 23/045* (2013.01); *F04D 3/00* (2013.01); *F04D 7/02* (2013.01); *F04D 7/04* (2013.01); *F04D 13/02* (2013.01); *F04D 13/08* (2013.01); *F04D 29/24* (2013.01); *F04D 29/4293* (2013.01); *F04D 29/466* (2013.01); *F04D 29/607* (2013.01); *F04D 29/628* (2013.01)

(58) Field of Classification Search
CPC ..... A01C 3/026; A01C 23/002; A01C 23/005; A01C 23/045
See application file for complete search history.

(56) References Cited

U.S. PATENT DOCUMENTS

| | | | |
|---|---|---|---|
| 3,557,981 A | | 1/1971 | Seymour |
| 3,610,416 A | | 10/1971 | Otto |
| 3,824,042 A | | 7/1974 | Barnes et al. |
| 3,948,450 A | | 4/1976 | Erlitz |
| 4,145,008 A | * | 3/1979 | Wolford .............. B02C 18/0092 241/185.6 |
| 4,406,413 A | | 9/1983 | Houle |
| 4,555,063 A | | 11/1985 | Goettsch |
| 4,594,006 A | | 6/1986 | Depeault |
| 4,830,585 A | | 5/1989 | Ruyle |
| 4,836,687 A | * | 6/1989 | Kardoes .............. B01F 7/00066 366/286 |
| 4,971,526 A | | 11/1990 | Ruyle |
| 5,100,303 A | | 3/1992 | Depault |
| 5,624,241 A | | 4/1997 | Nesseth |

OTHER PUBLICATIONS

Power-take-off pumps. Huning Brand Gulletechnik. http://www.bmad-melle.de/31-1-Power-take-off+pumps.html.
Office Action dated Aug. 2, 2013 on U.S. Appl. No. 13/038,189.
Office Action dated Apr. 9, 2014 on U.S. Appl. No. 13/038,189.
Office Action dated Oct. 2, 2015 on U.S. Appl. No. 14/570,504.

\* cited by examiner

PUMP FOR IMMERSION WITHIN A FLUID RESERVOIR

CROSS-REFERENCE TO RELATED APPLICATIONS

This application is a continuation of U.S. patent application Ser. No. 14/570,504 filed Dec. 15, 2014, which is a continuation of U.S. patent application Ser. No. 13/038,189 filed Mar. 1, 2011 now issued under U.S. Pat. No. 8,944,758 on Feb. 3, 2015, the contents of all of which are incorporated herein by reference.

FIELD OF THE INVENTION

The invention relates to pumps, particularly pumps that are positionable alongside a fluid reservoir for immersion within the reservoir. In particular, the invention relates to agricultural pumps for the pumping of liquid manure from liquid manure reservoirs.

BACKGROUND

Liquid manure from animal husbandry operations, particularly pig farming operations, is typically stored in a large manure reservoir or lagoon until there is a sufficient quantity available to spread or irrigate onto farm land for disposal. In order to remove the manure from the reservoir, a pump is used that is typically located alongside the reservoir and lowered into the reservoir. The pump can be free standing or attached to a tractor, which is often preferable to provide stability to the pump and a source of motive power for the pump.

The volumetric flow rate of fluid handled by the pump is large, typically in excess of 4000 gal/min; accordingly, it is desirable that the pump be efficient in terms of providing the required flow with minimal energy loss. Efficient pumps permit use of smaller tractors for providing motive power and reduce the fuel consumption of the tractor, reducing pump operating cost. In addition, it is desirable that the pump have large fluid openings and generous tolerances in order that solid material in the reservoir can be accommodated by the pump without plugging; this works against pump efficiency and makes it extra important to capitalize on efficiency gains wherever else they might be available.

Since the surface of the reservoir is variable in height relative to the side, due to either variation in the degree to which the reservoir is filled or due to removal of manure from the reservoir by pumping, it is desirable to have a pump with a variable depth position and optionally orientation relative to the surface. This is commonly accomplished by lowering the entire pump towards the surface, which often requires the tractor to be positioned dangerously close to the edge of the reservoir and is not suitable for all situations, particularly lagoons with gradually sloped sides or reservoirs with elevated sides.

In addition, it is desirable to have some means of surface agitation, either separate from the pump or incorporated into the pump itself, to disrupt formation of a cake or blanket on the surface of the reservoir and/or to prevent foam formation during pumping. The means of agitation often comprises a nozzle for re-directing a portion of the pumped fluid back to the surface of the reservoir; however, these nozzles are typically fixed and lack the ability to be positioned to break up cakes and foam.

Accordingly, there still exists a need for improved pumps, particularly pumps that are positionable alongside a fluid reservoir for immersion within the reservoir.

SUMMARY OF THE INVENTION

According to an aspect of the invention, there is provided a pump for immersion within a fluid reservoir comprising: a pump body comprising an elongated fluid conduit; a housing located at a bottom end of the pump body, the housing comprising a fluid inlet and at least two upwardly oriented tangential fluid outlets located on opposite sides of the body; a combiner for creating a fluid connection between the outlets and the fluid conduit; an impeller located within the housing having vanes shaped to direct the fluid tangentially within the housing.

The pump desirably further comprises a frame that may be adapted for mounting to a farm vehicle, particularly a tractor. The frame may comprise means for mounting to a three point hitch connection of a tractor, a type of connection that is well known in agriculture and permits a frame to be raised or lowered relative to the tractor. The pump body may be pivotable about at least a portion of the frame from a substantially horizontal transport position to a non-horizontal (e.g. vertical) working position. The pump may further comprise a frame adjustment means for adjusting an angular relationship between the pump body and horizontal. This allows the pump to be presented to the reservoir surface with a variety of angular orientations.

The pump body and fluid conduit may be extensible along a longitudinal axis of the pump in order to vary a length of the pump. This permits further flexibility in terms of pump position relative to the reservoir surface and allows the pump housing to be extended downwardly towards the surface as the reservoir is emptied. The pump may comprise a drive means for delivering motive power from a motive power source (such as an engine located, for example, on the tractor), to the impeller of the pump. The drive means may be adapted for adjustment with the pump body along the longitudinal axis. The drive means may comprise a hydraulic fluid conduit for providing hydraulic fluid power to a hydraulic motor connected to the impeller or, preferably, a Power Take-Off (PTO) shaft that is extensible with the pump body and fluid conduit. The pump body, fluid conduit, and drive means may comprise telescoping connections to permit variation in length.

The housing desirably improves efficiency of the pump by directing the fluid not just tangentially of the housing, but also upwardly. This eliminates the need for elbows to direct the fluid upwardly, which lead to pressure drop and efficiency loss. The outlets desirably direct the fluid upwardly from the housing at an angle of from 20 to 70 degrees relative to a plane of rotation of the impeller, more desirably at an angle of from 30 to 60 degrees, yet more desirably at an angle of from 40 to 50 degrees. The at least two outlets may comprise at least three outlets or at least four outlets. The at least two outlets may comprise, two outlets, three outlets or four outlets. The outlets may be evenly spaced about the circumference of the housing.

In order to impart the desired direction to the fluid as it leaves the housing and to reduce the amount of energy robbing directional change required, it is desirable that the vanes of the impeller are configured to direct the fluid both tangentially and upwardly, relative to the plane of rotation of the impeller, within the housing. This can be accomplished by providing the vanes with a curved side profile, such that rotation of the impeller causes the fluid to follow the curvature of the vane and directs the fluid tangentially to the direction of rotation and upwardly along the vane. This desirably causes the fluid to exit through the outlets in a direction substantially parallel to the outlets, reducing the need for directional change to be imparted to the fluid by the housing and thereby increasing the efficiency of the pump. In addition, use of multiple outlets reduces the pressure drop experienced by the fluid as it exits the pump, further improving pump efficiency and reducing the likelihood of blockage of the outlet due to any solid debris that may be present in the fluid being pumped.

The pump is desirably equipped with a bottom inlet located substantially in the center of the impeller. Although multiple inlet openings may be used, it is desirable that a singled inlet opening is used with a large enough diameter to permit debris to pass through the pump without plugging the inlet. The inlet diameter is desirably at least one third of the diameter of the pump housing, more desirably at least half of the diameter of the pump housing. By locating the inlet in the bottom of the housing, a relative shallower amount of fluid is required for pumping, permitting more complete drainage of the reservoir being pumped.

The combiner desirably directs fluid from the outlets upwardly along the body and towards a bottom end of the fluid conduit. The combiner desirably uses gradual bends to reduce the likelihood of pressure loss of the fluid, thereby improving overall pump efficiency. The combiner is desirably located between the housing and the bottom end of the fluid conduit, but can also be located elsewhere, for example near a top of the pump. In this case, it is desirable that flexible fluid conduits are employed in order to accommodate length variation of the pump body.

The pump may further comprise an agitator nozzle for directing a portion of the fluid passing through the pump outwardly from the pump and back towards a surface of the fluid reservoir. This desirably permits disruption of cake, blanket or foam formation on the surface of the reservoir. The agitator nozzle is desirably in fluid communication with the fluid conduit. The agitator nozzle may be connected to the fluid conduit by a rotatable nozzle body that permits rotation of the nozzle about the longitudinal axis. The pump may further comprise a nozzle orientation means for adjusting an angular relationship between the longitudinal axis and the nozzle. The nozzle orientation means may be mounted to the rotatable nozzle body. By permitting rotation and angular adjustment relative to the longitudinal axis, fluid exiting the nozzle can be directed towards any desired location on the surface of the reservoir, simplifying the task of disrupting cakes, blankets or foam on the surface. A flexible connection may be provided between the nozzle and the rotatable nozzle body.

According to another aspect of the invention, there is provided a pump for immersion within a fluid reservoir, the pump comprising: a frame; a telescoping pump body connected to the frame, the body comprising a telescoping fluid conduit, the body and conduit extensible along a longitudinal axis; a frame adjustment means for pivoting the telescoping pump body from a substantially horizontal transport position to a non-horizontal working position; a housing located at a bottom of the pump body comprising a bottom fluid inlet and at least two upwardly oriented tangential fluid outlets located on opposite sides of the body; a combiner for creating a fluid connection between the outlets and the telescoping fluid conduit, the combiner directing fluid from the outlets upwardly along the body and towards a bottom end of the fluid conduit; an impeller located within the housing having vanes shaped to direct the fluid tangentially and upwardly within the housing; a drive means for providing power to the impeller, the drive means extensible with the telescoping pump body; an agitator nozzle for directing a portion of the fluid outwardly from the pump back to a surface of the fluid reservoir, the agitator nozzle rotatable about the longitudinal axis; and, a nozzle orientation means for adjusting an exit trajectory of the nozzle.

According to yet another aspect of the present invention, there is provided a pump comprising an elongated fluid conduit aligned with a longitudinal axis of the pump; a housing at a bottom of the conduit containing an impeller for directing fluid through the conduit; an agitator nozzle in fluid communication with the conduit; and, a nozzle orientation means for adjusting an exit trajectory of the nozzle.

Although described herein with reference to the pumping of liquid manure, the pump according to the present invention can be employed in any fluid pumping situation, particularly where reservoirs with variable height are encountered, such as when pumping fluid from rivers, ponds, lakes, rain water storage reservoirs, etc.

BRIEF DESCRIPTION OF THE DRAWINGS

Having summarized the invention, preferred embodiments thereof will now be described with reference to the accompanying figures, in which:

FIG. 4b shows a sectional view of the pump housing of FIG. 4a;

DETAILED DESCRIPTION

Figure 1:
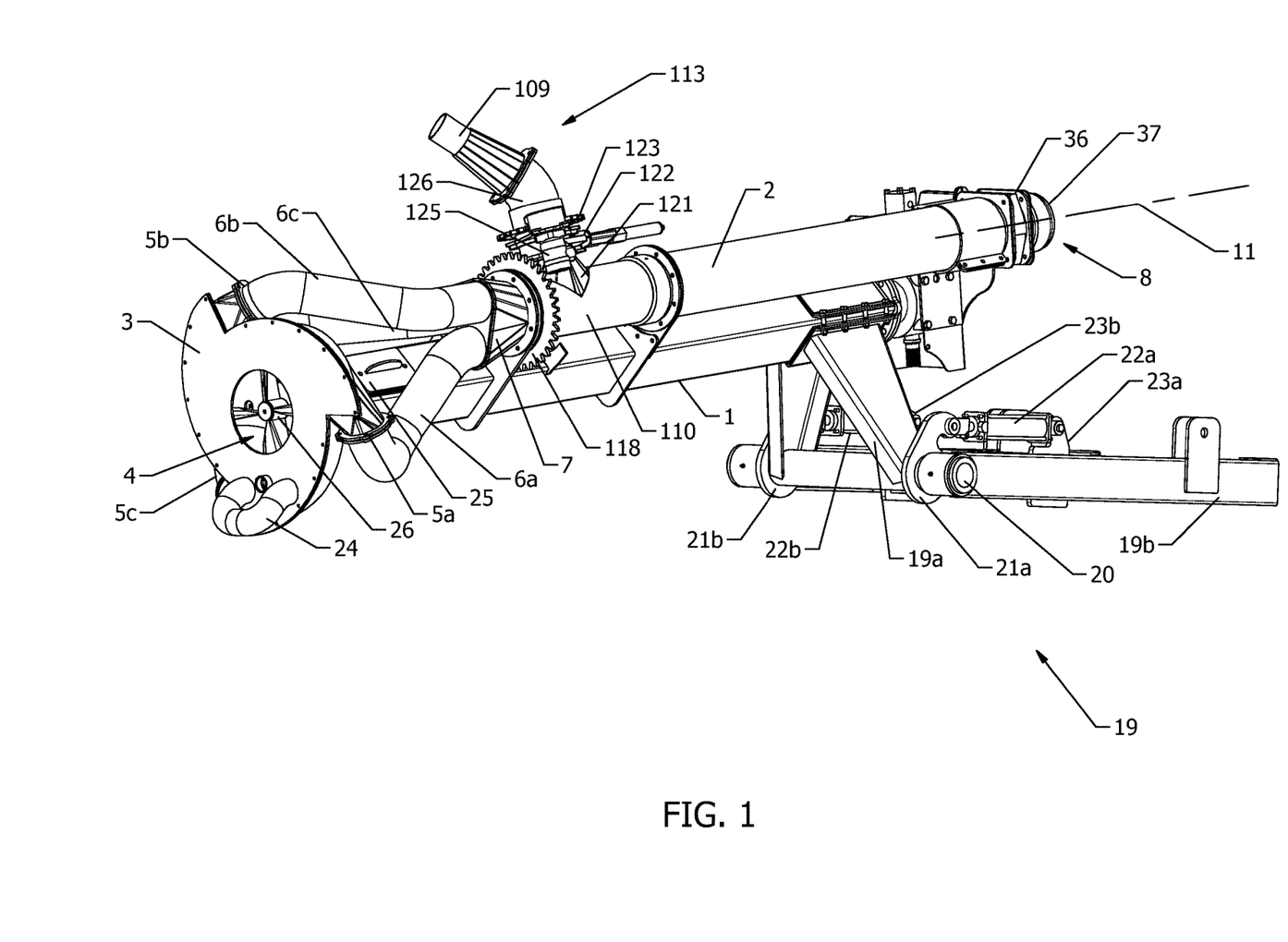
FIG. 1 shows a perspective view of a pump according to the invention in a transport position.

Referring to FIG. 1, an embodiment of a pump according to the present invention is shown comprising a pump body 1 and an elongated fluid conduit 2 with a centrally located longitudinal axis 11. A pump housing 3 is mounted to a bottom end of the pump body and comprises a fluid inlet 4 located on a bottom thereof and three upwardly oriented tangential fluid outlets 5a, 5b, 5c evenly spaced about the circumference of the housing 3 for directing fluid upwardly along the body 1. The outlets 5a, 5b, 5c are connected to outlet conduits 6a, 6b, 6c that are in turn connected to a fluid combiner 7. The combiner 7 directs the flow from the outlet conduits 6a, 6b into the elongated fluid conduit 2, where it moves upwardly towards the conduit outlet 8. A flow control valve 36, comprising a hydraulically actuated gate valve, is flange mounted at the outlet 8. Fluid exiting the outlet 8 can be delivered to rigid or flexible conduit, depending on what is best suited to the application, attached to the pump via outlet connector 37.

Figure 6:
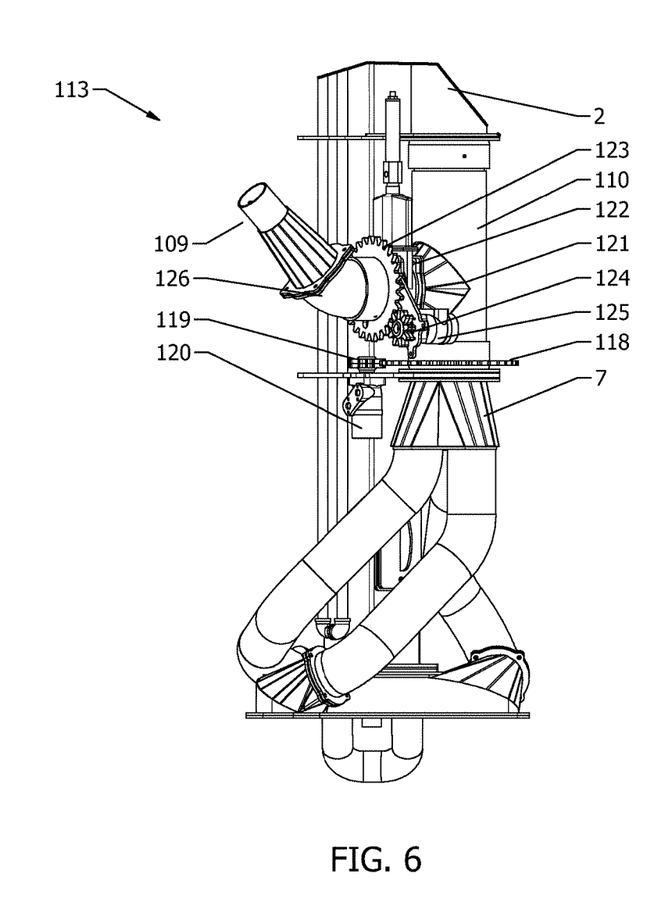
FIG. 6 shows an embodiment of a nozzle orientation means according to the invention in a first position.
Figure 7:
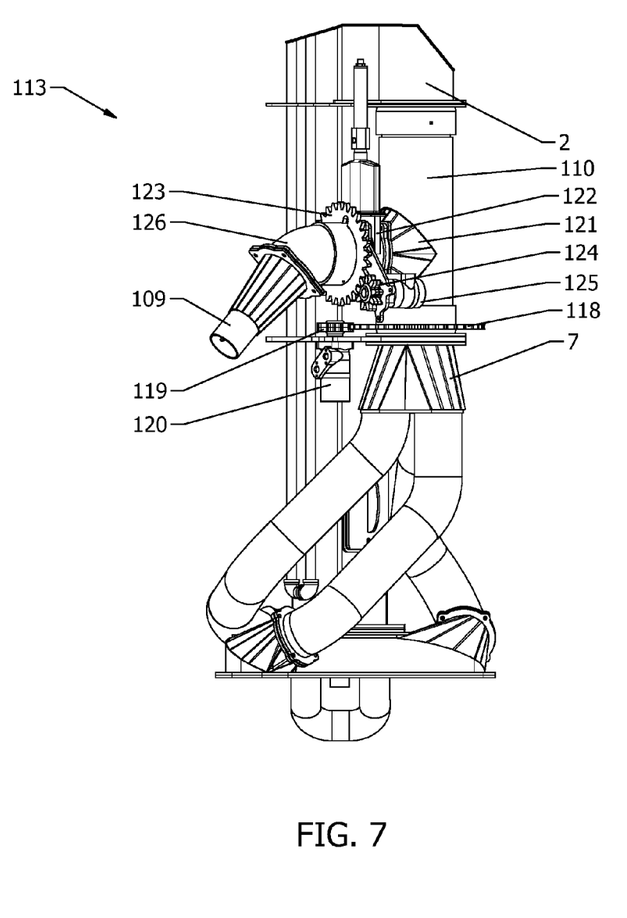
FIG. 7 shows the nozzle orientation means of FIG. 6 in a second position.
Figure 8:
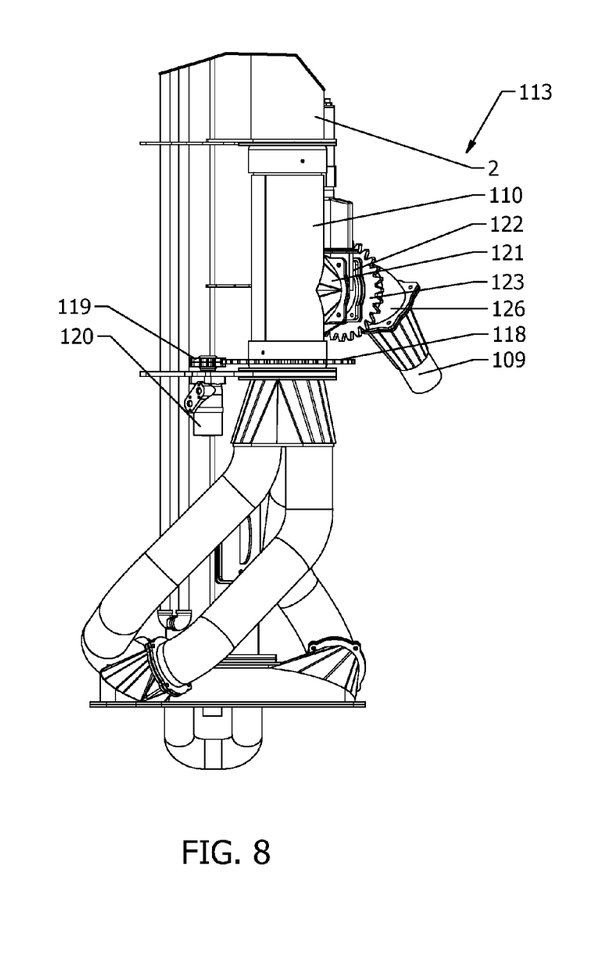
FIG. 8 shows the nozzle orientation means of FIG. 6 in a third position.

Turning additionally to FIGS. 6 through 8, the fluid conduit 2 comprises a nozzle body 110 that is connected to an agitator nozzle 109, both of which are movable via a nozzle orientation means 113. The nozzle body 110 comprises a section of the fluid conduit 2 that is rotatable about a longitudinal axis 11 by way of engagement between a nozzle sun gear 118 and a nozzle moon gear 119 that is actuated by a hydraulic motor 120. Suitable seals, such as O-rings, are provided to maintain a fluid seal between the combiner 7 and the upper portion of the fluid conduit 2, despite the rotational movement of the nozzle body 110. The nozzle body 110 comprises a T-shaped portion 121 to which a nozzle gate valve 122 is flange mounted. The nozzle gate valve 122 is hydraulically actuated and can be adjusted in order to provide a means for controlling the fluid flow rate through the nozzle 109. A second sun gear 123 is engaged with a second moon gear 124 that is actuated by a second hydraulic motor 125. Rotation of the motor 125 causes the nozzle 109 to rotate about an axis perpendicular to the longitudinal axis 11. The nozzle 109 is equipped with a fixed 45° elbow 126. By selecting a desired combination of rotation of the nozzle sun gear 118 and the second sun gear 123, a wide range of fluid exit trajectories can be obtained from the nozzle 109. A number of potential trajectories are illustrated with reference to FIGS. 6-8. This allows a stream of the fluid being pumped to exit the pump and be re-directed back to the surface of the fluid reservoir in order to provide agitation and to break-up any solid clumps of debris or foam that may have accumulated at the surface.

Figure 2:
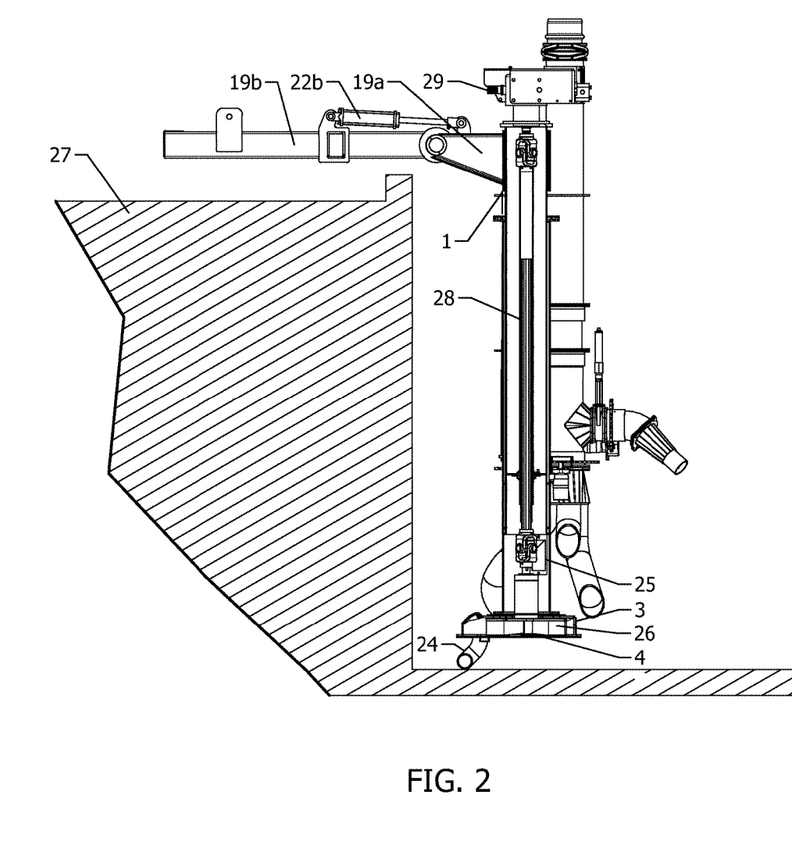
FIG. 2 shows a right side cut-away view of the pump of FIG. 1 in a working position.
Figure 3A:
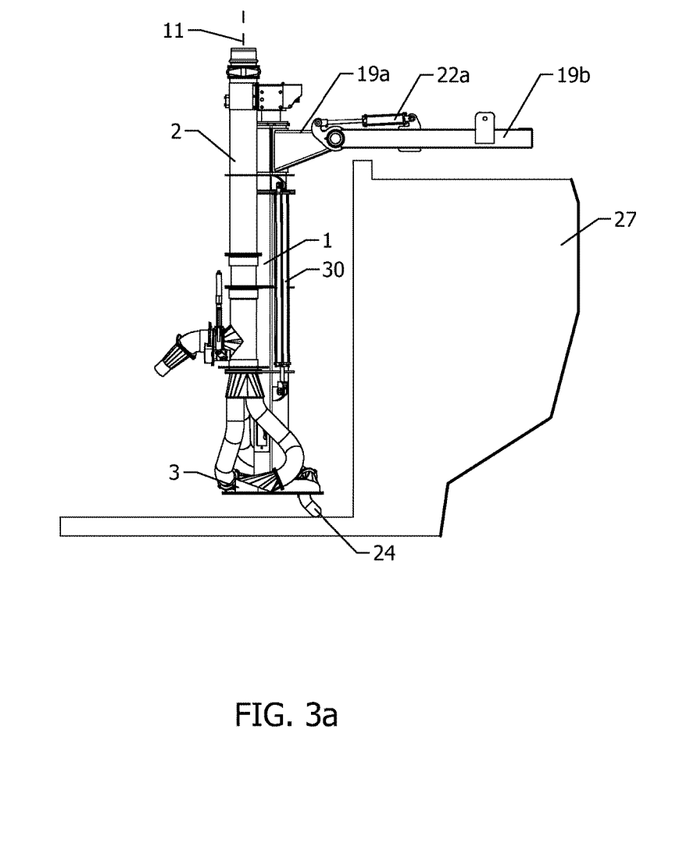
FIG. 3a shows a left side cut-away view of the pump of FIG. 1 in a working position.
Figure 3B:
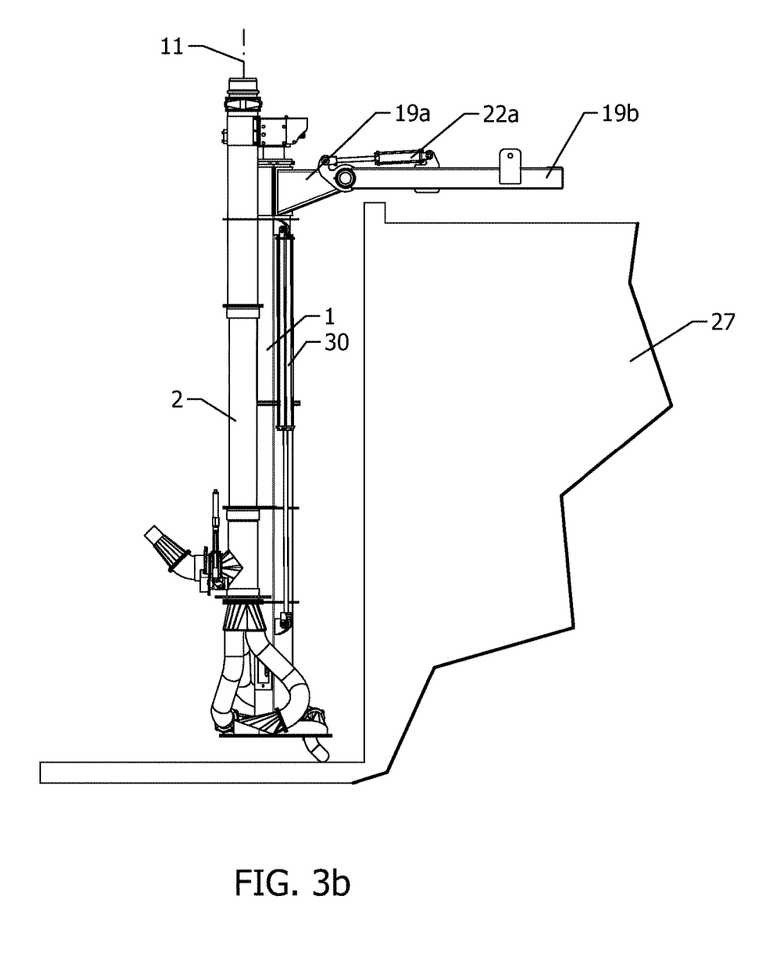
FIG. 3b shows a left side cut-away view of the pump of FIG. 1 in an extended working position.

Returning now to FIG. 1, the pump further comprises a frame 19 that comprises a first portion 19a pivotally connected to a second portion 19b via a frame pivot shaft 20. The first portion 19a is attached to the pump body 1. A frame adjustment means is provided for adjusting an angular relationship of the pump body relative to horizontal. The frame adjustment means comprises a pair of frame dogs 21a, 21b that are attached to the first frame portion 19a proximal the pivot shaft 20. The frame dogs 21a, 21b are interconnected with a pair of pivot cylinders 22a, 22b mounted to pivot lugs 23a, 23b of the second portion 19b. Actuation of the cylinders 22a, 22b causes the first portion 19a to rotate about the pivot shaft 20 relative to the second portion 19b in order to change the angular orientation of the pump body 1 from a substantially horizontal transport position, as shown in FIG. 1, to a non-horizontal working position, for example a vertical working position as shown in FIGS. 2 and 3a, 3b. This allows the pump body to be positioned at any desired angle relative to the surface of the fluid reservoir, in order to accommodate a variety of reservoir edge conditions and surface heights.

In one embodiment, the frame 19 is adapted for connection to a farm tractor; however, in other embodiments, the frame may be adapted for connection to a truck or other vehicle. The frame 19 shown is adapted for connection to the farm tractor by a three-point hitch mechanism that is well known in the art; however, in other embodiments, the frame may be wheeled or otherwise mounted for independent connection to the farm tractor in order that it may be readily disconnected from the tractor and left in a desired location. Various means of connecting the pump to the farm tractor are known to persons skilled in the art.

The pump housing comprises a bottom rest 24 attached to a bottom thereof. The bottom rest is used to support the base of the pump against a bottom of the fluid reservoir and prevents damage to the housing when the pump is set down when not in use. The bottom rest 24 also provides a minimum spacing between the bottom of the fluid reservoir and the inlet 4. An access door 25 is provided proximal the bottom of the pump body 1. The access door is used to connect or dis-connect a pump drive means (not shown in FIG. 1) from a pump impeller 26 located within the housing 3, in a manner that will be further described hereinafter.

Referring to FIG. 2, the pump is shown in a substantially vertical working position. The frame cylinders 22b (22a not shown) are extended such that the first portion 19a of the frame and the pump body 1 are pivoted downwardly relative to the second portion 19b. The bottom rest 24 is positioned against the bottom of the fluid reservoir 27, ensuring that the housing 3 is not damaged and keeping a certain minimum spacing between the bottom of the reservoir 27 and the pump inlet 4 in the bottom of the housing. A cutaway portion of the body 1 shows a pump drive means comprising a rigid Power Take-Off (PTO) shaft 28 that is connected to the tractor via a PTO connector 29. A flexible knuckle (not shown) behind the connector allows the rotation of the PTO connector 29 to be translated down the shaft 28 to the impeller 26. The access door 25 is used to detach the shaft 28 from the impeller for maintenance purposes. The shaft 28 is of a telescoping type that permits its length to be adjusted with changes in length of the pump body 1.

Referring to FIGS. 3a and 3b, in FIG. 3a the cutaway portion of the body 1 shows a hydraulic body cylinder 30 in a retracted position. The body cylinder 30 may be extended, as shown in FIG. 3b, along the longitudinal axis 11 to change the length of the pump body 1, the fluid conduit 2 and the PTO shaft (28, not shown in FIGS. 3a and 3b), which are all telescopic. This allows the depth of the pump to be increased in the event that the fluid reservoir 27 is deeper, as shown in FIG. 3b. By accommodating variable depth and variable entrance angle (by adjustment of the angle between the first portion 19a of the frame relative to the second portion 19b) a variety of different types of reservoir edge conditions and depths can be accommodated.

Figure 4A:
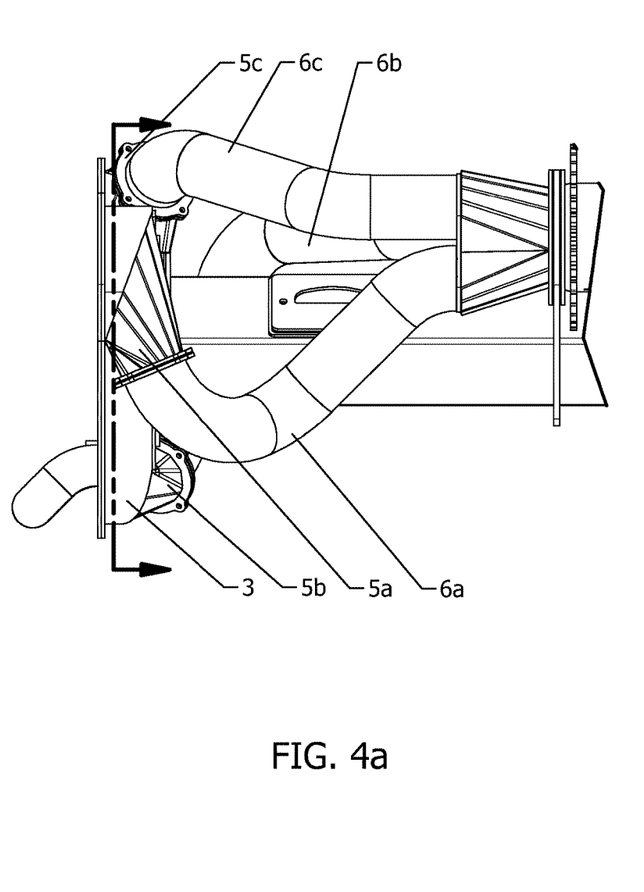
FIG. 4a shows a side view of a pump housing according to the invention.
Figure 4B:
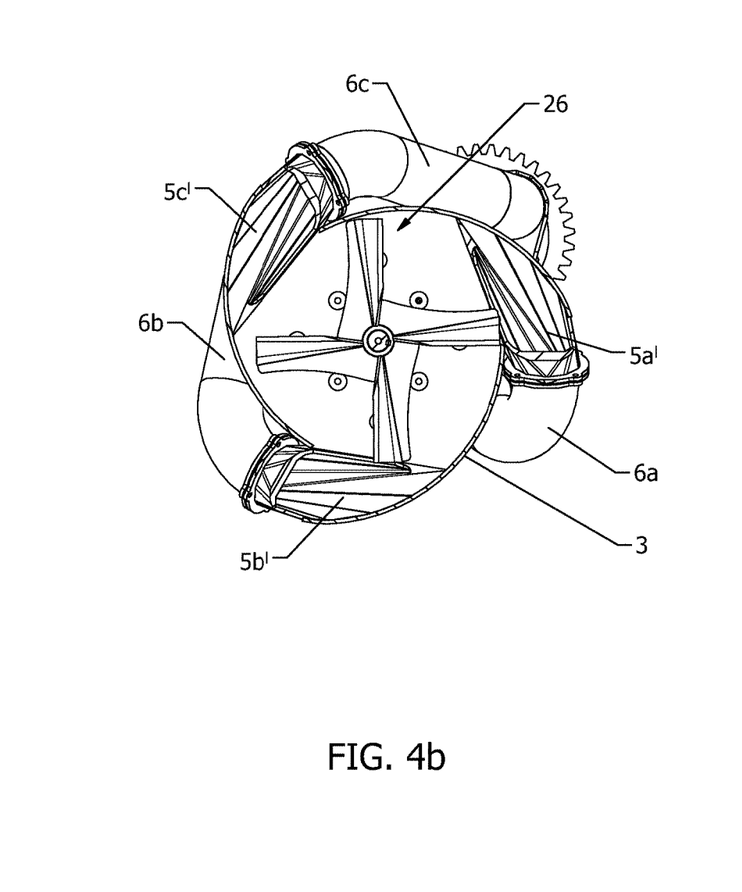

Referring to FIG. 4a, the housing 3 is shown in greater detail. The outlets 5a, 5b, 5c are tangential to the radius of the housing and are also angled upwardly, relative to when the housing is in a working position. In conventional pump housings, fluid exits tangentially and is then required to execute a 90° bend; by providing an upward angle to the tangential housing, a more gradual transition is created, resulting in less fluid pressure loss. Referring additionally to FIG. 4b, it can also be seen that providing the upward angle to the tangential outlets 5a, 5b, 5c results in a much larger opening area, denoted as 5a', 5b', 5c' within the housing. This opening area 5a', 5b', 5c' eventually constricts down to the diameter of the outlet conduits 6a, 6b, 6c. However, by providing a larger opening area within the housing and gradually transitioning to a smaller opening area, fluid pressure drop is reduced. The tangential fluid outlets 5a', 5b', 5c' therefore allow higher flow rates for a given power input due to the upward angle, which makes the upward turn more gradual and creates a larger opening within the housing that gradually transitions to the outlet connector diameter. The impeller 26 is also shown.

For manure pumping applications, in particular, it is known that fluid conduits and pump outlets having diameters of less than about 5" are prone to plugging with debris. It is important to provide a certain minimum outlet area in order to reduce pump pressure drop and energy loss for a given flow rate. It has been found that use of multiple smaller outlets allows the desired minimum outlet area to be provided, while advantageously allowing the impeller size to be reduced as compared with a single opening. This leads to a reduction in the power required to provide a certain flow rate. An alternative approach is to provide a larger or similar sized impeller as would be used with a single outlet opening and realize an increased flow rate through the pump at a given power input. The multiple outlet configuration thereby co-operates with the impeller design to provide a number of potential benefits, according to the application requirements.

Figure 5:
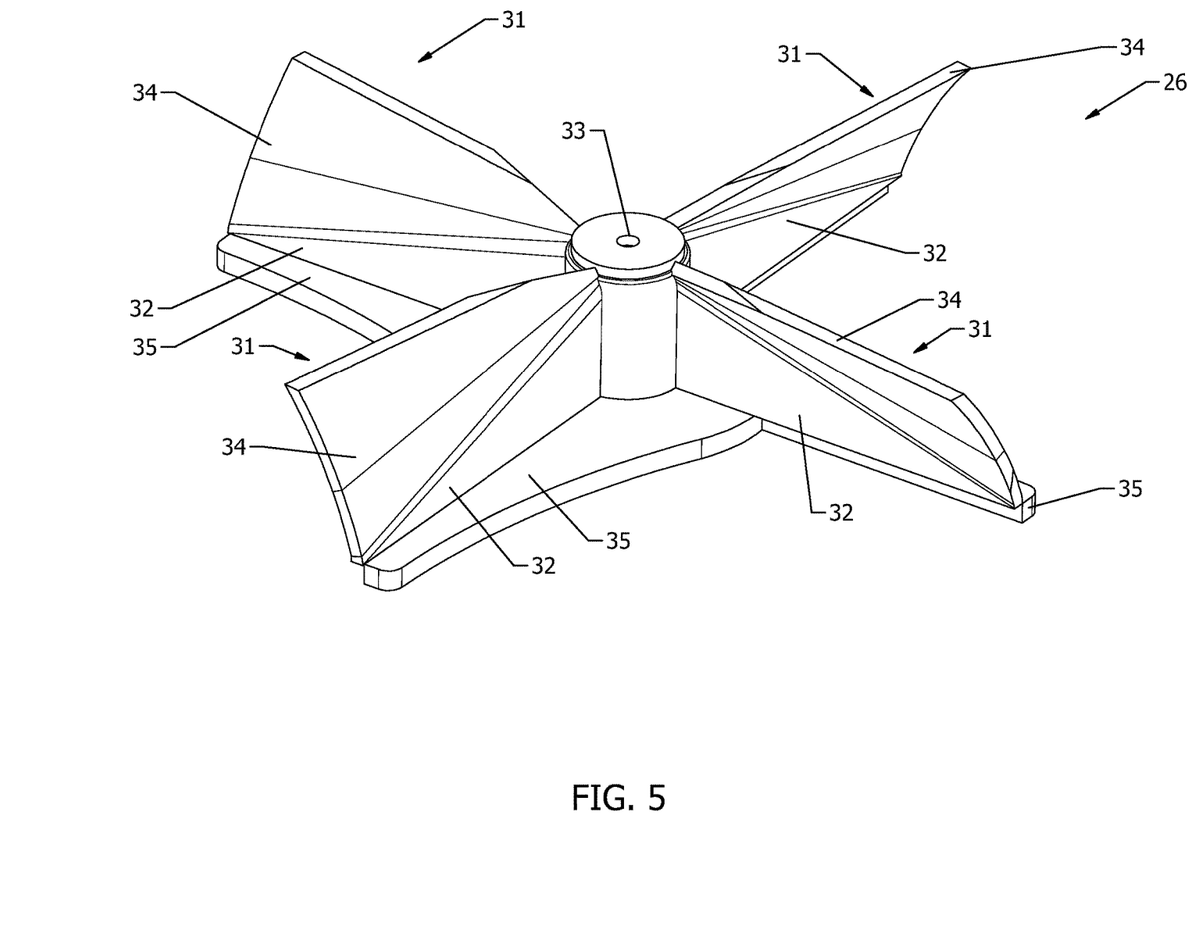
FIG. 5 shows an impeller of a pump according to the invention.

Referring additionally to FIG. 5, the impeller 26 is shown in greater detail. It can be seen that each of the vanes 31 comprises a flat portion 32, perpendicular to the direction of rotation of the impeller 26 (clockwise about the center 33), and a curved portion 34 that is curved forwardly in the direction of travel. The area of the curved portion 34 and thus the degree of curvature increases progressively with distance from the center 33 of the impeller. This has the effect of directing the fluid both tangentially and upwardly, towards the upwardly angled outlets 5a, 5b, 5c. Since the fluid is already being directed upwardly by the impeller 26, the result is less fluid pressure loss upon entering the outlets 5a, 5b, 5c than would otherwise occur if a directional change were induced solely due to friction between the fluid and the housing 3. The forwardly curved vane portion 34 therefore co-operates synergistically with the housing, specifically the upwardly angled tangential outlets 5a, 5b, 5c, to reduce pressure loss and therefore provide a greater flow rate for a given power input than would otherwise be obtained.

Returning briefly to FIG. 1, due to the enhanced flow rate provided by the design of the housing 3 and impeller 26, the pump inlet 4 in the bottom of the housing is preferably provided as a single central opening having a diameter that is at least a third of the diameter of the housing, more preferably at least half the diameter of the housing. This over-sized pump inlet allows the desirable high fluid flow rate to pass through the pump without internal cavitation. Resuming with FIGS. 4-5, in order to prevent pump inefficiency due to fluid short circuiting at the center of the impeller 26, the lower edge of each vane 31 is equipped with a blocking plate 35 that is perpendicular to the flat portion 32. The plate 35 has a curved edge and increases in area towards the center 33 of the impeller 26. The blocking plate 35 has the effect of occluding some of the area of the inlet 4 near the center 33 to prevent short-circuiting of fluid between the vanes 31 due to the large area of the inlet 4. This illustrates yet another manner in which the design of the impeller 26 co-operates with the design of the housing 3 to improve pump performance.

Figure 9:
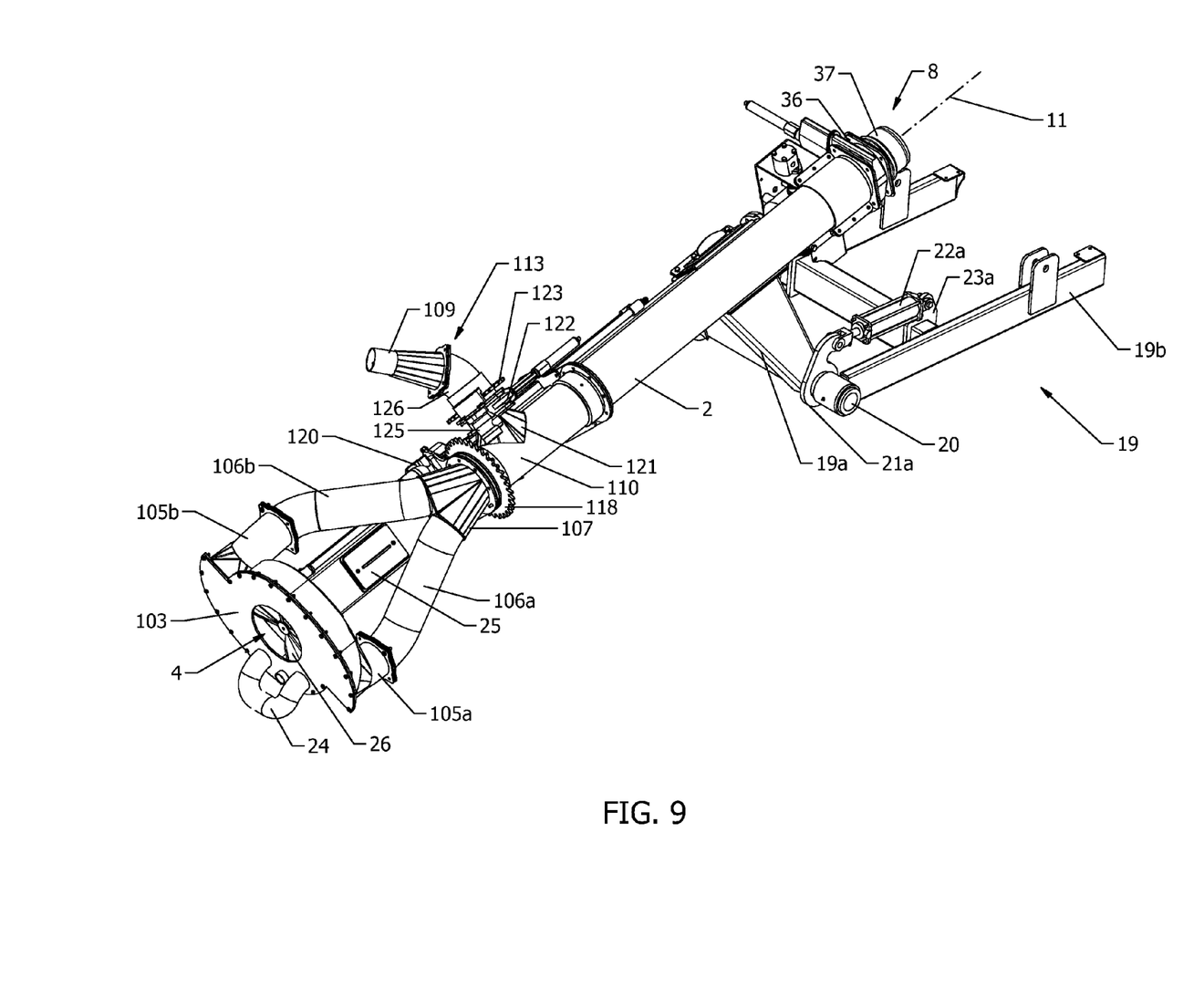
FIG. 9 shows a perspective view of another embodiment of a pump according to the invention having two fluid outlets.

Referring to FIG. 9, a pump according to the invention is shown that is similar in most respects to the pump described with reference to FIGS. 1-8, with features denoted by like reference numerals. However, the housing 103 has two fluid outlets 105a, 105b. The fluid outlets 105a, 105b are connected to two connectors 106a, 106b that meet at a substantially Y-shaped combiner 107. The function and operation of the remaining components are otherwise similar.

Figure 10:
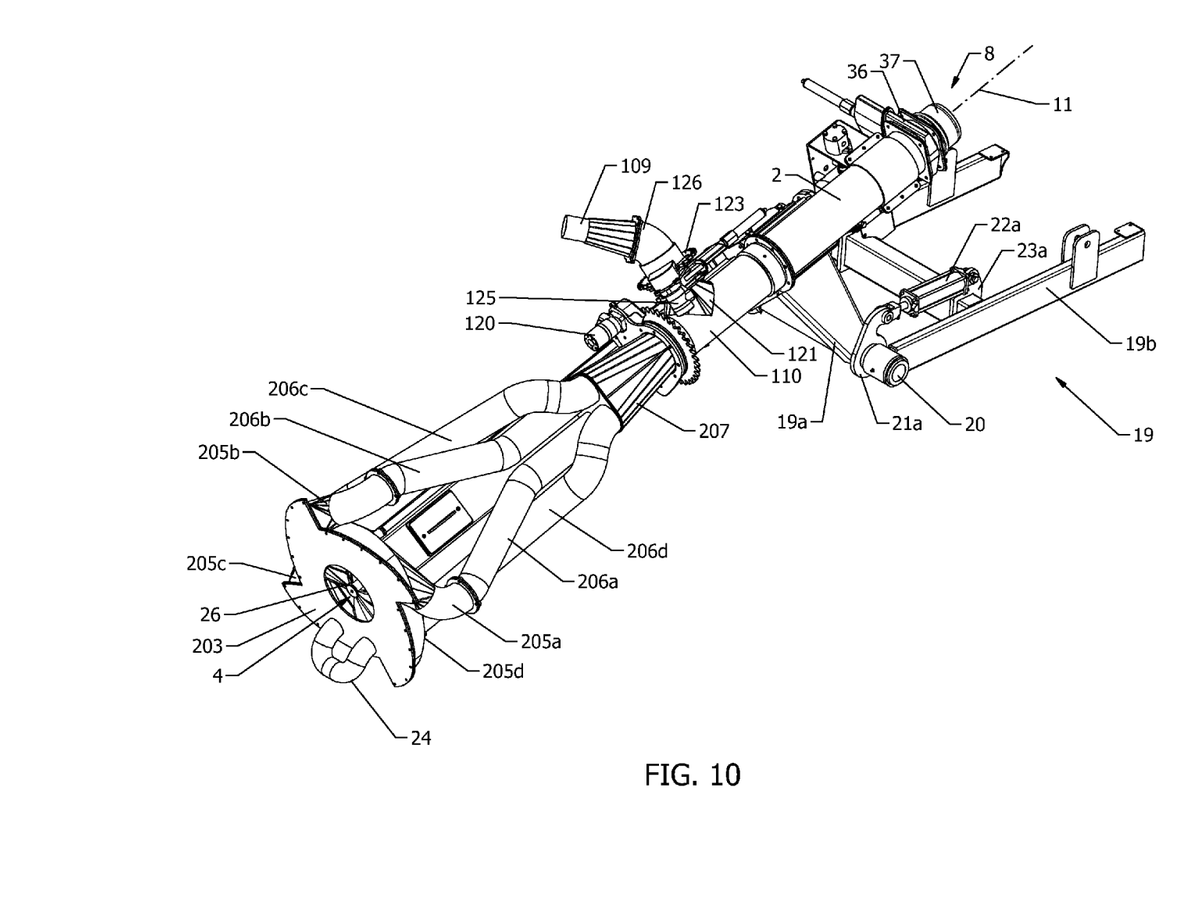
FIG. 10 shows a perspective view of yet another embodiment of a pump according to the invention having four fluid outlets; and, FIG. 11 shows a perspective view of yet another embodiment of a pump according to the invention, having an alternative nozzle orientation means.

Referring to FIG. 10, a pump according to the invention is shown that is similar in most respects to the pump described with reference to FIGS. 1-8, with features denoted by like reference numerals. However, the housing 203 has four fluid outlets 205a, 205b, 205c, 205d. The fluid outlets 205a, 205b, 205c, 205d are connected to four connectors 206a, 206b, 206c, 206d that meet at a combiner 207. The function and operation of the remaining components are otherwise similar.

Figure 11:
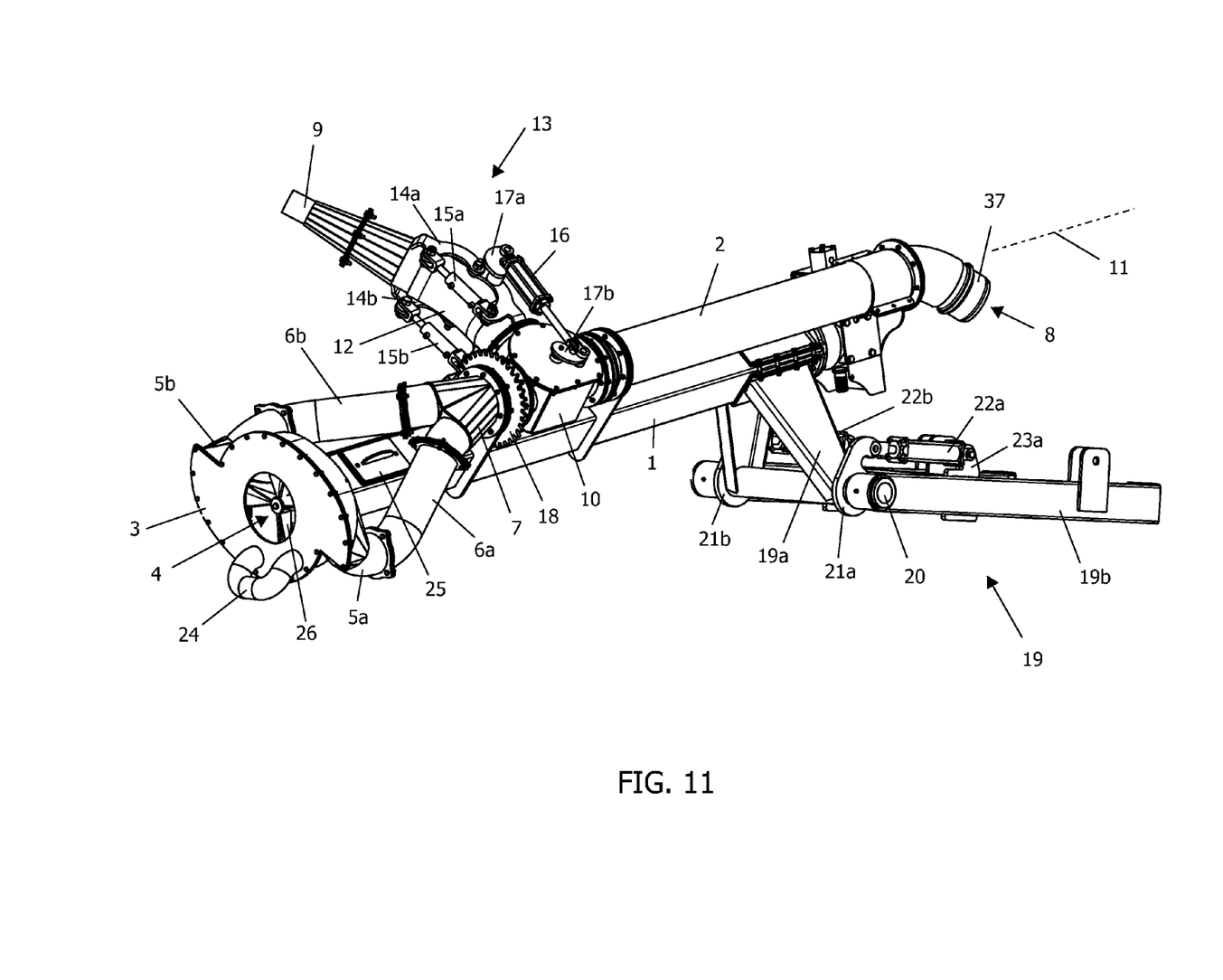

Referring to FIG. 11, a pump as described with reference to FIG. 9 is shown. However, the fluid conduit 2 comprises a nozzle body 10 to which is connected an agitator nozzle 9. The nozzle body 10 provides a fluid connection between the fluid conduit 2 and the nozzle 9 via a flexible connector 12. The flexible connector 12 may be made from, for example, an elastomeric material. The flexible connector 12 allows the angular orientation of the nozzle 9 to be adjusted relative to the longitudinal axis 11.

A nozzle orientation means 13 is provided for effecting this adjustment in orientation. In the embodiment shown, the orientation means 13 comprises a pair of C-shaped linkages 14a, 14b located on either side of the nozzle 9 and connecting the nozzle 9 to the nozzle body 10. The C-shaped linkages 14a, 14b are each actuated by a pair of hydraulic linkage cylinders 15a, 15b. Each C-shaped linkage pivots in the middle upon actuation of the cylinders to open or close, thereby adjusting the angular orientation of the nozzle 9 relative to the pump body. However, due to limitations in the stroke of the linkage cylinders 15a, 15b, the orientation means also comprises an orientation cylinder 16 interconnected by orientation linkages 17a and 17b with one of the C-shaped linkages 14a and the nozzle body 10. The orientation cylinder 16 permits larger macro adjustments to be made to the orientation of the nozzle 9, whereas the smaller linkage cylinders 15a, 15b permit fine adjustments to be made.

The nozzle body 10, and therefore the nozzle 9, are rotatable about the longitudinal axis 11. The nozzle body 10 includes sealing means, such as O-rings, to prevent fluid leakage at the site of rotation. The nozzle body comprises a nozzle sun gear 18, which is engaged by a nozzle moon gear (not shown in FIG. 11) that is driven by a hydraulic motor (not shown in FIG. 11). Activation of the motor in a clockwise or counter-clockwise direction causes an opposite rotation of the sun gear 18 and the nozzle body 10. By adjustment of both the rotation of the nozzle body 10 about the longitudinal axis 11 and the angular orientation of the nozzle 9, any desired orientation of the nozzle may be created relative to the pump.

The foregoing describes preferred embodiments of the invention and is not meant to be construed in a limiting sense. Persons skilled in the art will readily appreciate other variants and mechanical equivalents that may achieve the objects and advantages of the present invention without departing from the scope of the accompanying claims.

The invention claimed is:

1. A pump for immersion within a fluid reservoir comprising:
    a pump body comprising an elongated fluid conduit extensible along a longitudinal axis of the pump body;
    a drive means extensible along the longitudinal axis;
    a hydraulic cylinder configured to extend along the longitudinal axis to change a length of both the fluid conduit and the drive means;
    a housing located at a bottom end of the pump body, the housing comprising a fluid inlet and a fluid outlet, the fluid outlet in fluid communication with the fluid conduit;
    an impeller connected to the drive means and located within the housing to direct fluid from the inlet to the outlet in the housing; and, an agitator nozzle in fluid connection with the conduit for directing a portion of the fluid in the conduit outwardly from the pump, the agitator nozzle connected to the fluid conduit by a rotatable nozzle body and rotatable about the longitudinal axis.

2. The pump according to claim 1, wherein the fluid conduit is telescoping.

3. The pump according to claim 1, wherein the fluid conduit has telescoping connections to permit variation in the length.

4. The pump according to claim 1, wherein the drive means provides power to the impeller.

5. The pump according to claim 1, wherein the drive means comprises a telescoping drive shaft.

6. The pump according to claim 1, wherein the fluid conduit is telescoping, the drive means comprises a telescoping drive shaft and the hydraulic cylinder is configured to telescope both the fluid conduit and the drive shaft.

7. The pump according to claim 1, wherein the hydraulic cylinder is further configured to change a length of the pump body when extending along the longitudinal axis.

8. The pump according to claim 1, wherein the pump body is telescoping.

9. The pump according to claim 8, wherein the hydraulic cylinder is further configured to telescope the pump body when extending along the longitudinal axis.

10. The pump according to claim 1, wherein the pump further comprises a frame, the pump body pivotable about at least a portion of the frame from a substantially horizontal transport position to a non-horizontal working position.

11. The pump according to claim 10, wherein the pump further comprises a frame adjustment means for adjusting an angular relationship between the pump body and horizontal.

12. The pump according to claim 11, wherein the frame comprises a first portion pivotally connected to a second portion, the first portion connected to the pump body, the pump body pivoting about the second portion when the first portion pivots.

13. The pump according to claim 12, wherein the frame adjustment means comprises first and second pivot cylinders, each pivot cylinder connected to the first and second portions, actuation of the first and second pivot cylinders causing the first portion to pivot relative to the second portion thereby adjusting an angular relationship between the pump body and horizontal.

14. The pump according to claim 1, wherein the hydraulic cylinder is further configured to move the agitator nozzle along the longitudinal axis when changing the length of both the fluid conduit and the drive means.

15. The pump according to claim 1, wherein the pump further comprises a nozzle orientation means for adjusting an exit trajectory of the nozzle.

16. The pump according to claim 15, wherein the nozzle orientation means further comprises a hydraulic cylinder connected to a linkage connected to the nozzle.

17. The pump according to claim 1, wherein the nozzle or nozzle body further comprises a means for controlling a fluid flow rate through the nozzle.

18. The pump according to claim 1, wherein the housing comprises two or more fluid outlets.

19. The pump according to claim 1, wherein the housing comprises three or more fluid outlets.

20. The pump according to claim 1, wherein the drive means is adapted for adjustment with the pump body along the longitudinal axis.

21. The pump according to claim 1, wherein the inlet comprises a single central opening having a diameter that is at least a third of a diameter of the housing.

22. The pump according to claim 1, wherein the drive means comprises a hydraulic fluid conduit for providing hydraulic fluid power to a hydraulic motor connected to the impeller.

23. The pump according to claim 1, further comprising a flow control valve comprising an actuated gate valve.

24. The pump according to claim 1, further comprising an access door proximal a bottom of the pump body.

25. A pump for immersion within a fluid reservoir comprising:
a frame;
a telescoping pump body connected to the frame, the body comprising a telescoping fluid conduit, the body and conduit extensible along a longitudinal axis;
a housing located at a bottom of the pump body comprising a bottom fluid inlet and a fluid outlet, the fluid outlet in fluid communication with the fluid conduit;
an impeller located within the housing to direct fluid from the inlet to the outlet in the housing;
a drive means for providing power to the impeller, the drive means extensible with the telescoping pump body and the telescoping fluid conduit;
a hydraulic cylinder configured to extend along the longitudinal axis to change a length of the pump body, the fluid conduit and the drive means;
a frame adjustment means for pivoting the telescoping pump body from a substantially horizontal transport position to a non-horizontal working position;
an agitator nozzle for directing a portion of the fluid outwardly from the pump back to a surface of the fluid reservoir, the agitator nozzle rotatable about the longitudinal axis; and,
a nozzle orientation means for adjusting an exit trajectory of the nozzle.

26. The pump according to claim 25, wherein the drive means comprises a telescoping drive shaft.

27. The pump according to claim 25, wherein the telescoping fluid conduit comprises telescoping connections to permit variation in length of the fluid conduit.

28. The pump according to claim 25, wherein the hydraulic cylinder is further configured to move the agitator nozzle along the longitudinal axis when changing the length of both the fluid conduit and the drive means.

29. The pump according to claim 25, wherein the nozzle or nozzle body further comprises a means for controlling a fluid flow rate through the nozzle.

30. The pump according to claim 25, wherein the frame comprises a first portion pivotally connected to a second portion, the first portion connected to the pump body, the pump body pivoting about the second portion when the first portion pivots.

31. The pump according to claim 30, wherein the frame adjustment means comprises first and second pivot cylinders, each pivot cylinder connected to the first and second portions, actuation of the first and second pivot cylinders causing the first portion to pivot relative to the second portion thereby adjusting an angular relationship between the pump body and horizontal.

32. The pump according to claim 25, wherein the housing comprises two or more fluid outlets.

33. The pump according to claim 25, wherein the housing comprises three or more fluid outlets.

34. The pump according to claim 25, wherein the drive means is adapted for adjustment with the pump body along the longitudinal axis.

35. The pump according to claim 25, wherein the inlet comprises a single central opening having a diameter that is at least a third of a diameter of the housing.

36. The pump according to claim 25, wherein the drive means comprises a hydraulic fluid conduit for providing hydraulic fluid power to a hydraulic motor connected to the impeller.

37. The pump according to claim 25, further comprising a flow control valve comprising an actuated gate valve.

38. The pump according to claim 25, further comprising an access door proximal a bottom of the pump body.

39. The pump according to claim 25, wherein the nozzle orientation means further comprises a hydraulic cylinder connected to a linkage connected to the nozzle.

* * * * *